United States Patent
Civettini

(10) Patent No.: US 9,734,957 B2
(45) Date of Patent: Aug. 15, 2017

(54) DISCONNECTOR FOR PHOTOVOLTAIC APPLICATIONS

(71) Applicant: BREMAS ERSCE S.P.A., Cambiago (IT)

(72) Inventor: Franco Civettini, Castel Mella (IT)

(73) Assignee: BREMAS ERSCE S.P.A., Cambiago (IT)

( * ) Notice: Subject to any disclaimer, the term of this patent is extended or adjusted under 35 U.S.C. 154(b) by 63 days.

(21) Appl. No.: 14/653,207

(22) PCT Filed: Dec. 6, 2013

(86) PCT No.: PCT/EP2013/075828
§ 371 (c)(1),
(2) Date: Jun. 17, 2015

(87) PCT Pub. No.: WO2014/095431
PCT Pub. Date: Jun. 26, 2014

(65) Prior Publication Data
US 2015/0332877 A1 Nov. 19, 2015

(30) Foreign Application Priority Data
Dec. 19, 2012 (IT) .......................... MI2012A002175

(51) Int. Cl.
*H01H 19/20* (2006.01)
*H01H 1/42* (2006.01)
(Continued)

(52) U.S. Cl.
CPC .............. *H01H 1/42* (2013.01); *H01H 19/04* (2013.01); *H01H 19/08* (2013.01); *H01H 19/10* (2013.01);
(Continued)

(58) Field of Classification Search
CPC .......... H01H 1/42; H01H 19/04; H01H 19/08; H01H 19/14; H01H 19/10; H01H 19/64; H02S 40/34
(Continued)

(56) References Cited

U.S. PATENT DOCUMENTS

2011/0259718 A1* 10/2011 Weber .................... H01H 19/02
200/293
2014/0144761 A1* 5/2014 Webber .................. H01H 19/02
200/11 A

FOREIGN PATENT DOCUMENTS

| EP | 0297055 A1 | 12/1988 |
| EP | 2107581 A1 | 10/2009 |
| WO | 2012168553 A1 | 12/2012 |

OTHER PUBLICATIONS

International Search Report and Written Opinion issued Jun. 4, 2014 re: Application No. PCT/EP2013/075828; citing: EP 2 107 581 A1, EP 0 297 055 A1 and WO 2012/168553 A1.

* cited by examiner

*Primary Examiner* — Renee Luebke
*Assistant Examiner* — Lheiren Mae A Caroc
(74) *Attorney, Agent, or Firm* — Cantor Colburn LLP

(57) ABSTRACT

A disconnector for photovoltaic applications having at least two modular contact boxes, each contact box having a box-like body coupled to a contiguous box-like body of a contiguous modular contact box. The box-like body forms a central seat that accommodates a rotatable contact and two peripheral seats, each of which accommodates a connection portion of a corresponding fixed contact that can be accessed from the outside of the modular contact box. The rotatable contact is able to rotate about the axis of the central seat with respect to the box-like body in order to engage the fixed (Continued)

contacts arranged with their connection portion in the peripheral seats or to disengage from the fixed contacts.

9 Claims, 15 Drawing Sheets

(51) Int. Cl.
  *H02S 40/34*    (2014.01)
  *H01H 19/14*    (2006.01)
  *H01H 19/04*    (2006.01)
  *H01H 19/08*    (2006.01)
  *H01H 19/10*    (2006.01)
  *H01H 19/64*    (2006.01)

(52) U.S. Cl.
  CPC ............ *H01H 19/14* (2013.01); *H01H 19/64* (2013.01); *H02S 40/34* (2014.12); *H01H 2205/002* (2013.01); *H01H 2223/044* (2013.01)

(58) Field of Classification Search
  USPC ........................................................ 200/570
  See application file for complete search history.

DISCONNECTOR FOR PHOTOVOLTAIC APPLICATIONS

FIELD

The present disclosure relates to a disconnector, particularly for photovoltaic applications.

BACKGROUND

In photovoltaic systems, the low currents produced by the individual photovoltaic cells are combined in parallel in order to provide the current and the total power needed by the utilization system. It is customary therefore that in a photovoltaic system each individual photovoltaic cell is isolated, protected and disconnected. In the field of photovoltaic applications, but more generally in the field of devices for electrical systems, it is known, for this purpose, to use disconnectors and, among these, rotary switches.

Conventional disconnectors are constituted generally by one or more modular contact boxes, each comprising generally a rotatable contact and a pair of fixed contacts. The rotation of the rotatable contact, which in the case of the coupling of two or more modular contact boxes occurs simultaneously for each module, makes it possible to stop or allow the flow of current between the two fixed contacts of each module.

These disconnectors are used both in direct-current circuits and in alternating-current circuits.

A problem shared by all conventional disconnectors, both working in DC circuits and in AC circuits, concerns the need to limit, and possibly prevent, the phenomenon of the forming of what is called the electric arc.

The electric arc is a phenomenon that occurs during the operations for opening and closing an electric circuit. It is produced by the ionization of the air between the electrical contacts, with formation of plasma. In fact, in the opening step, the contact surface between the electrical contacts tends to diminish progressively, with a consequent increase in the current density. As a consequence, the temperature increases to extremely high values, causing the triggering and subsequent development of the electric arc.

The phenomenon of the electric arc is obviously accentuated in the case of DC circuits, because in AC circuits the periodic drop to zero of the electric current value determines a natural and periodic extinguishing of the electric arc.

The formation of the electric arc always entails, however, a deterioration of the contact electrodes and often risks even the welding of the contacts themselves.

Some methods for extinguishing an electric arc are known and implemented in different ways in conventional disconnectors. A first method consists substantially in physically spacing the electrical contacts. A second method consists in inserting further elements of electrical contact, such as metal laminae or magnets, capable of breaking the electric arc formed between the two main contacts, forcing the plasma to expand. A third method consists in increasing the opening speed of the contacts, so as to increase, in the shortest possible time, the physical distance between the electrical contacts.

These disconnectors, however, are not free from drawbacks, including the fact that in order to be able to meet at least partially said requirements they have bulky structures and complex geometries.

Another drawback of these conventional disconnectors is the difficulty in assembling the components.

SUMMARY

The aim of the present disclosure is to provide a disconnector, particularly for photovoltaic applications, that obviates the drawbacks and overcomes the limitations of the background art, having a limited bulk and being quick to assemble.

Within this aim, an object of the present disclosure is to provide a disconnector that facilitates the extinction of the electric arc.

A further object of the disclosure is to provide a disconnector that is capable of giving the greatest assurances of reliability and safety of use.

Another object of the disclosure is to provide a disconnector that is easy to provide and economically competitive in comparison to the background art.

This and other objects that will become more apparent hereinafter are achieved by a disconnector, particularly for photovoltaic applications, comprising at least two modular contact boxes, each comprising a box-like body coupled to a contiguous box-like body of a contiguous modular contact box, each box-like body forming a central seat that accommodates a rotatable contact and two peripheral seats, each of which accommodates a connection portion of a corresponding fixed contact that can be accessed from the outside of said modular contact box, said rotatable contact being able to rotate about the axis of said central seat with respect to said box-like body in order to engage the fixed contacts arranged with their connection portion in said peripheral seats or to disengage from said fixed contacts, characterized in that said two peripheral seats of a same box-like body are arranged on the same side with respect to a central plane that passes through said axis of the central seat and in that said two peripheral seats of a box-like body and the two peripheral seats of the contiguous box-like body are arranged on mutually opposite sides with respect to said central plane.

BRIEF DESCRIPTION OF THE FIGURES

Further characteristics and advantages of the disclosure will become more apparent from the description of a preferred but not exclusive embodiment of a disconnector, particularly for photovoltaic applications, according to the disclosure, illustrated by way of non-limiting example with the aid of the accompanying drawings, wherein.

DETAILED DESCRIPTION OF THE FIGURES

Figure 1:
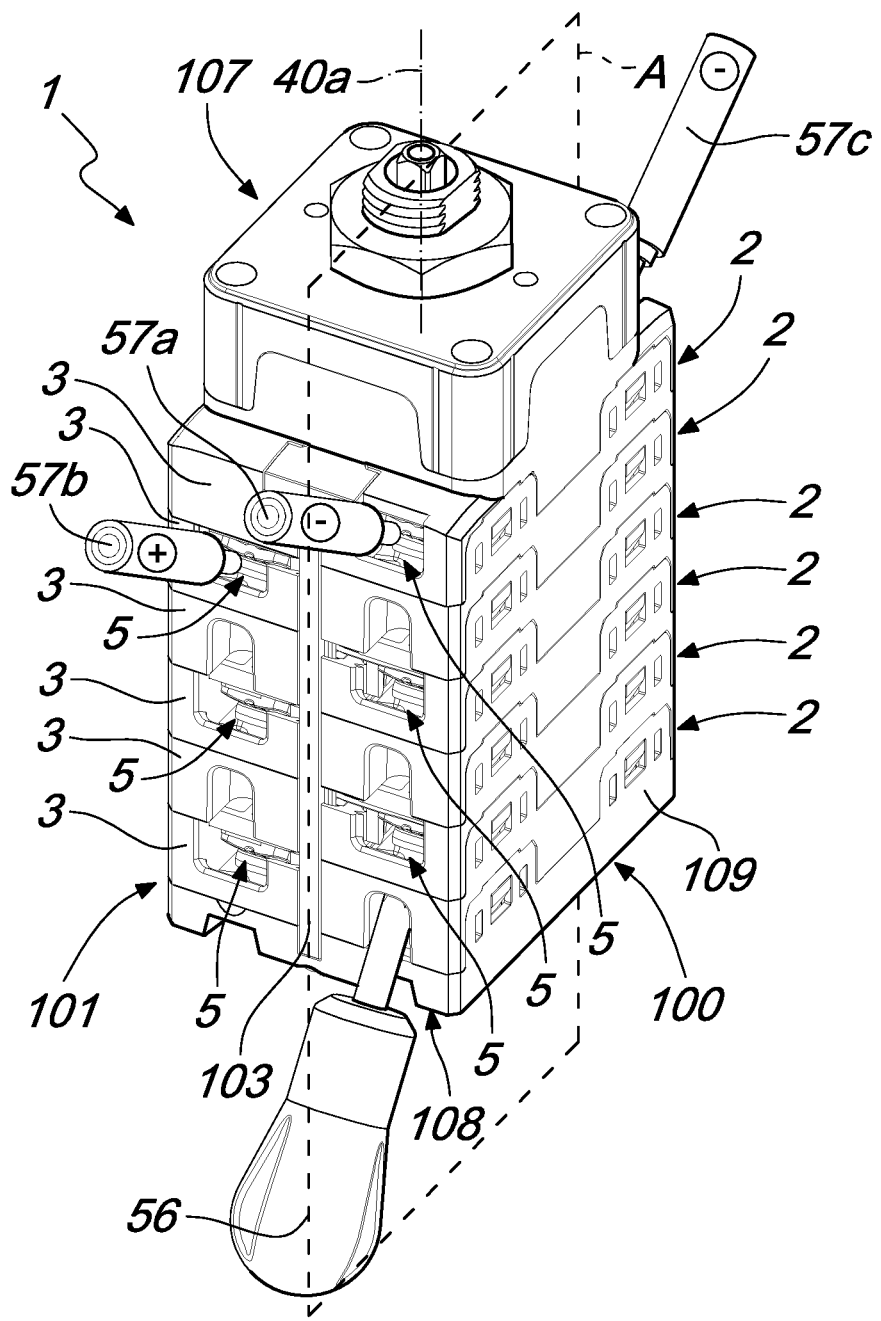
FIG. 1 is a perspective view of a disconnector according to the disclosure.

With reference to the cited figures, the disconnector, particularly for photovoltaic applications, generally designated by the reference numeral 1, comprises at least two modular contact boxes 2, each comprising a box-like body 3 coupled to a contiguous box-like body 3 of a contiguous modular contact box 2. The box-like body 3 forms a central seat 40 that accommodates a rotatable contact 4 and two peripheral seats 50, each of which accommodates a connection portion 51 of a fixed contact 5 that can be accessed from the outside of the modular contact box 2. The rotatable contact 4 is able to rotate about the axis 40a of the central seat 40 with respect to the box-like body 3 in order to engage the fixed contacts 5, arranged with their connection portion 51 in the peripheral seats 50, or to disengage from the fixed contacts 5.

According to the disclosure, the two peripheral seats 50 of the same box-like body 3 are arranged on the same side with respect to an imaginary central plane A that passes through the axis 40a. Moreover, according to the disclosure, the two peripheral seats 50 of the box-like body 3 and the two peripheral seats 50 of the contiguous box-like body 3 are arranged on mutually opposite sides with respect to the imaginary central plane A.

Advantageously, the box-like body 3 has a substantially rectangular plan shape; the central seat 40 passes through the two opposite end faces of the box-like body 3 and the imaginary central plane A is parallel to the two opposite sides 30, 31 of the box-like body 3.

Figure 2:
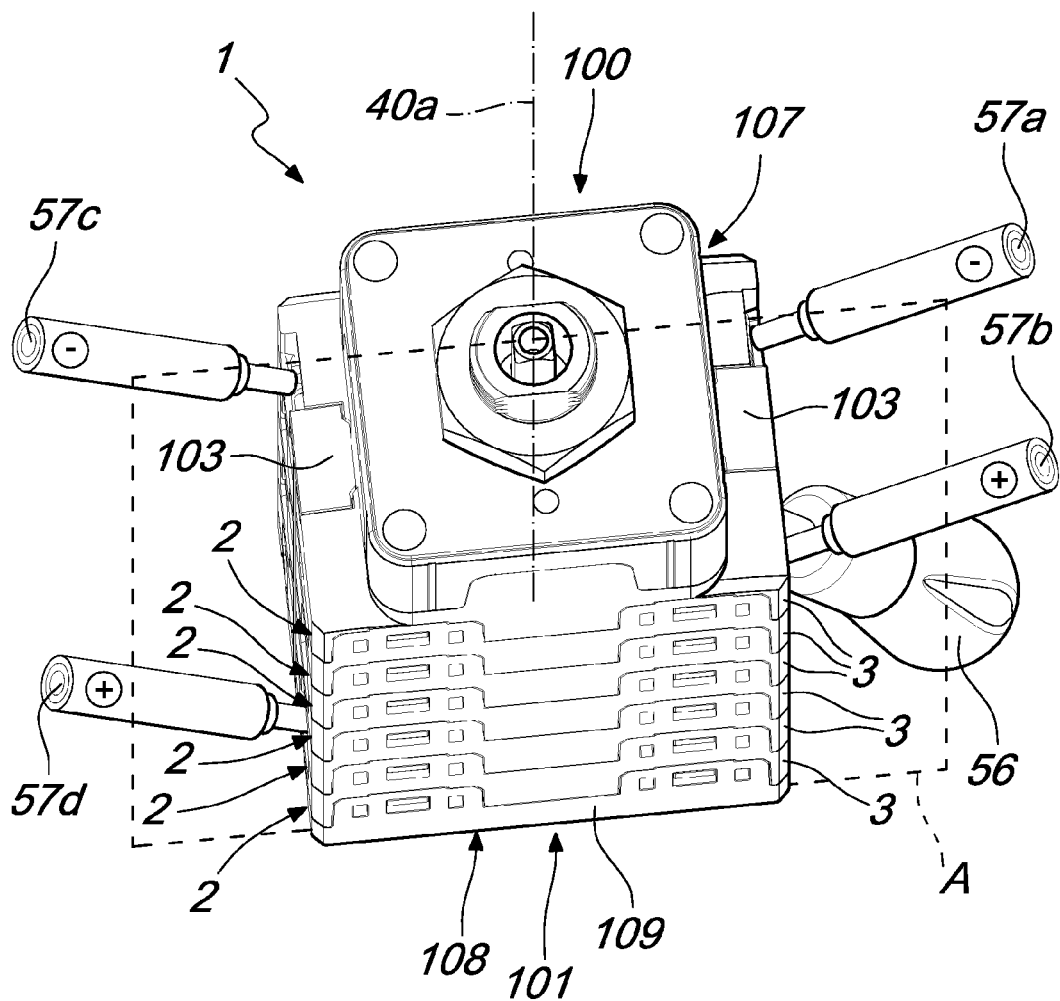
FIG. 2 is another perspective view of the disconnector of FIG. 1.
Figure 4:
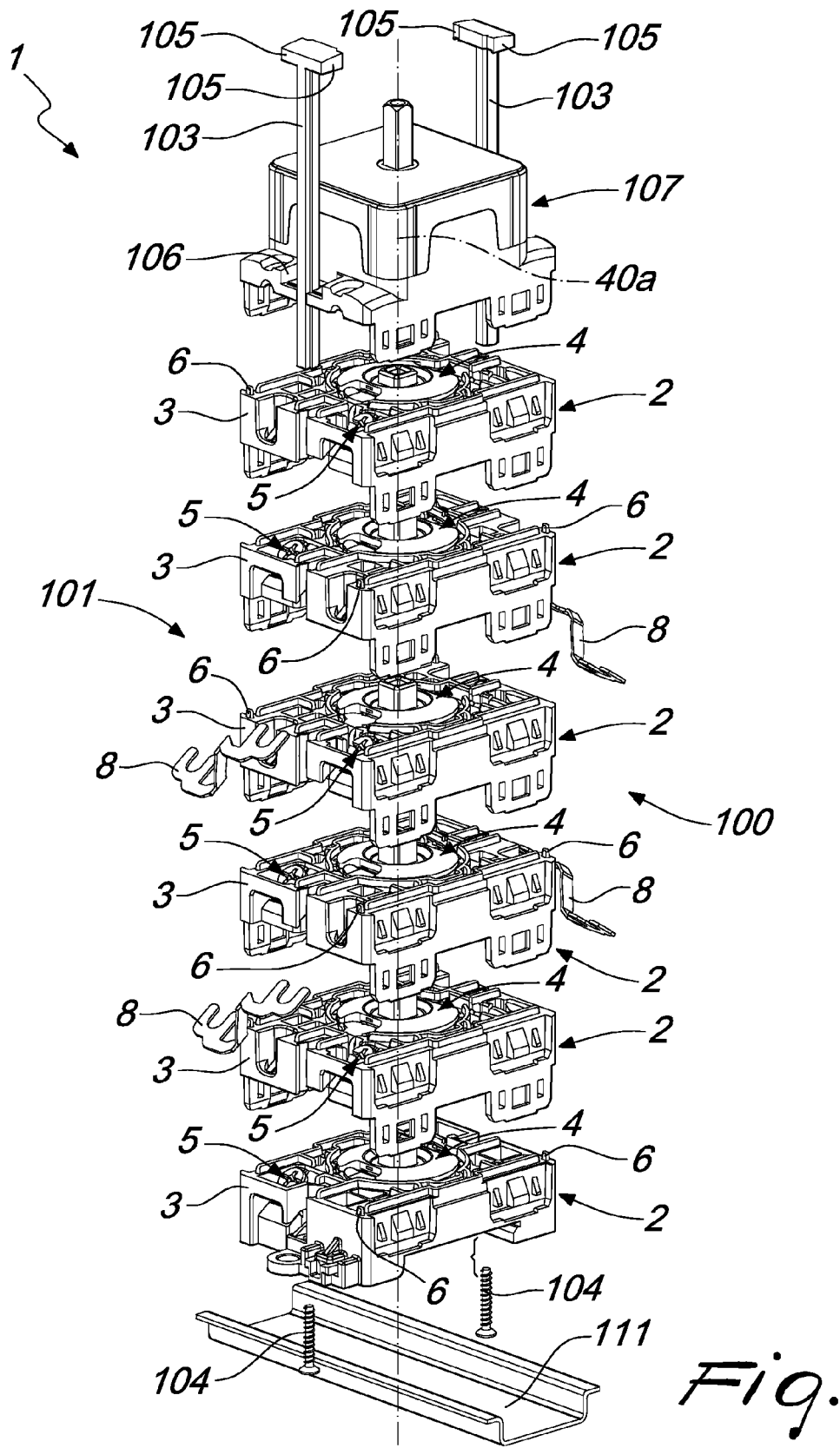
FIG. 4 is an exploded perspective view of a constructive variation of the disconnector according to the disclosure.

By way of example, FIGS. 1 and 2 show a disconnector 1 which comprises six modular contact boxes 2 mutually stacked on each other. The peripheral seats 50, which accommodate the fixed contacts 5, are located, for each modular contact box 2, alternately proximate to the side 100 and the side 101 of the disconnector 1, respectively. The difference between the disconnector 1 shown in FIGS. 1 and 2 and the variation shown in the exploded view of FIG. 4 consists in the different orientation of the modular contact boxes 2 with respect to the covering element 107 and to the end face of said disconnector 1.

Figure 6:
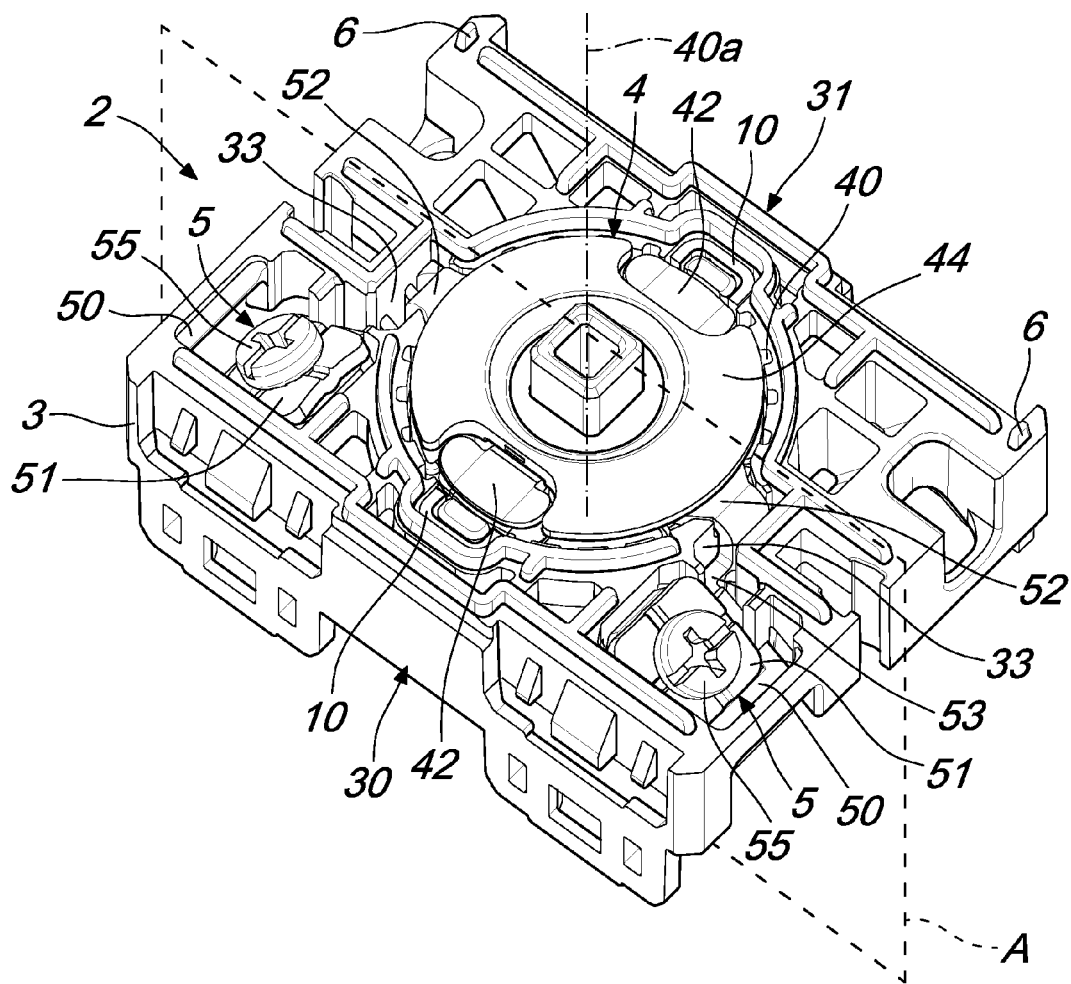
FIG. 6 is a perspective view of a modular contact box of a disconnector according to the disclosure, illustrated with the electrical contacts in the "off" configuration.
Figure 7:
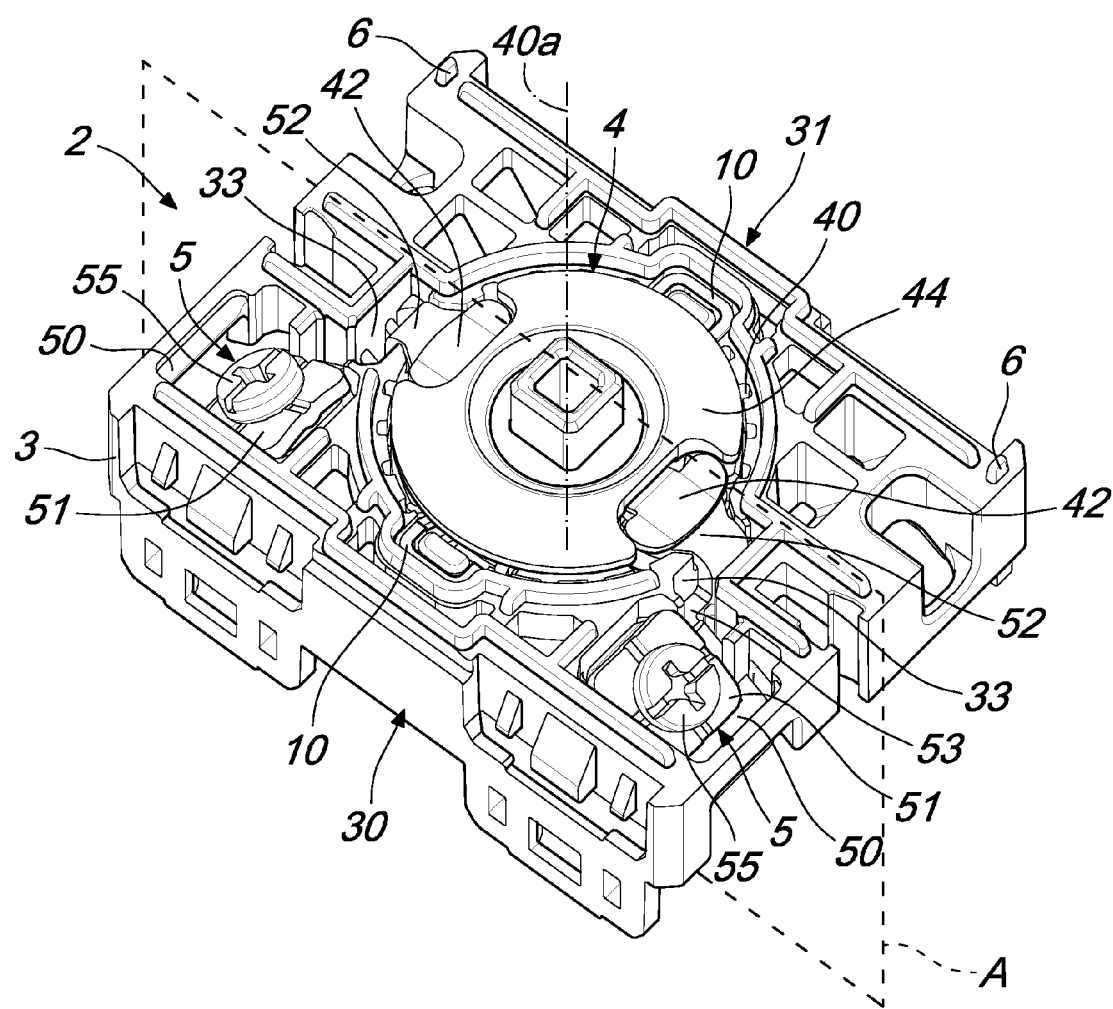
FIG. 7 is a perspective view of the modular contact box of FIG. 6, illustrated with the electrical contacts in the "on" configuration.
Figure 8:
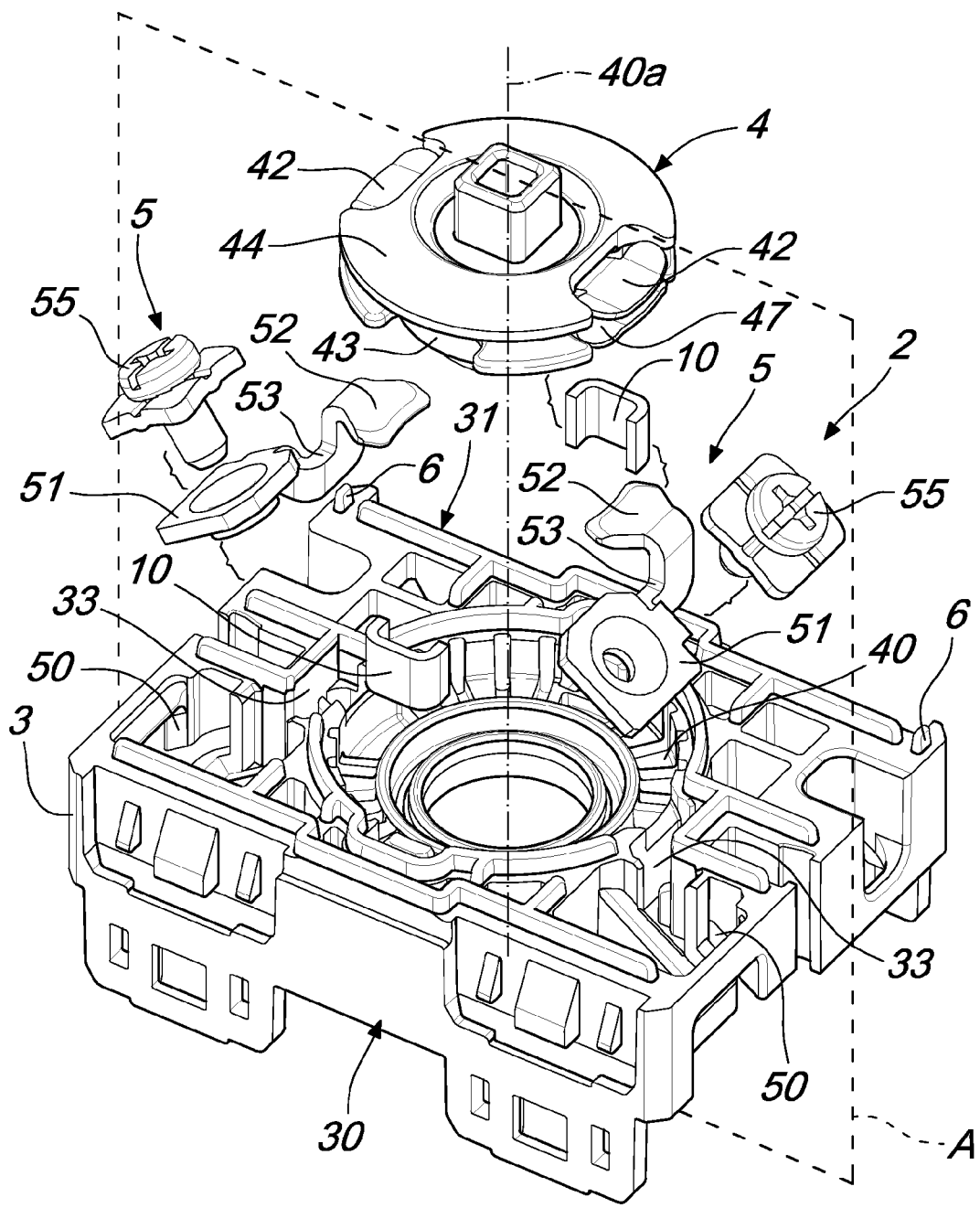
FIG. 8 is an exploded perspective view of the modular contact box of FIG. 7.
Figure 9:
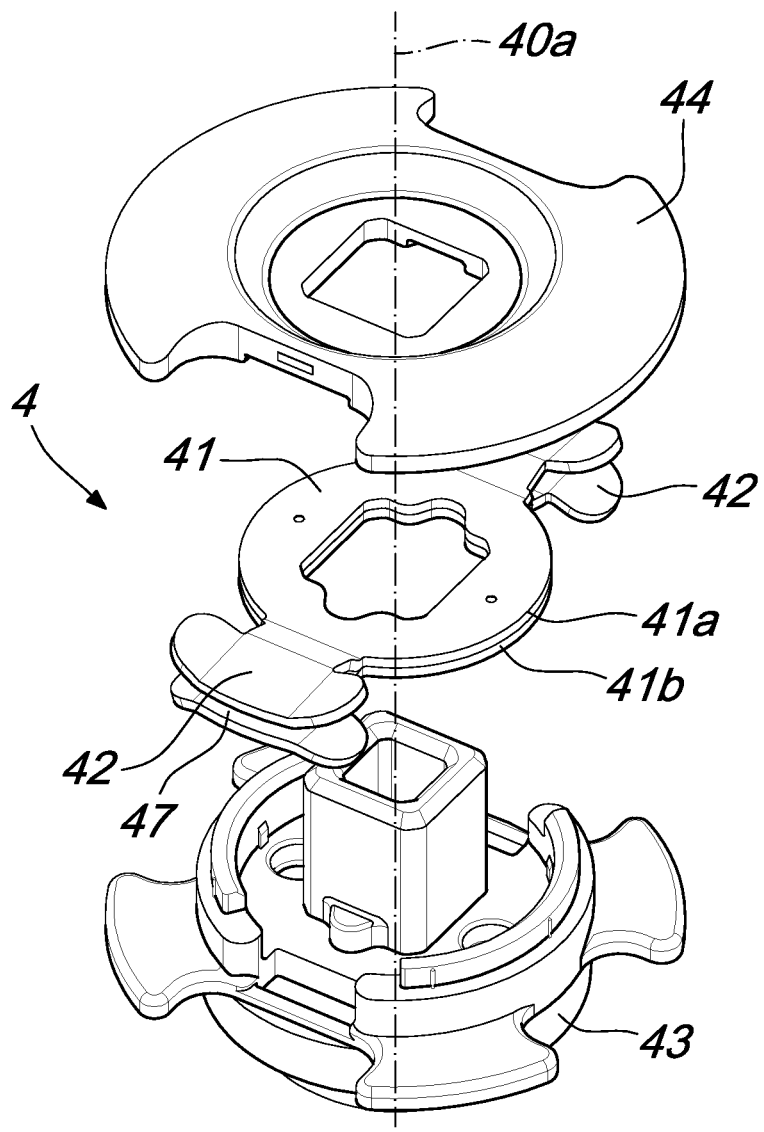
FIG. 9 is an exploded perspective view of a rotatable contact of the modular contact box of FIG. 8.

As shown in FIGS. 6, 7 and 8, each modular contact box 2 comprises a box-like body 3, a rotatable contact 4, accommodated in the central seat 40 of the box-like body 3, and a pair of fixed contacts 5, each one accommodated, with the corresponding connection portion 51, in one of the two peripheral seats 50 of the box-like body 3.

Each fixed contact 5 comprises a connection portion 51, a contact portion 52 and a connection portion 53 that extends between the connection portion 51 and the contact portion 52. The connection portion 51 can be accessed from the outside of the modular contact box 2 and from the outside of said disconnector 1. Such connection portion 51 in fact can comprise a screw locking system 55, wherein the screw can be operated by means of a screwdriver 56, for being locked on an external electric conductor 57a, 57b, 57c and 57d. The contact portion 52 of the fixed contact 5 is adapted to establish an electrical contact with the rotatable contact 4. In particular, the contact portions 52 of the fixed contacts 5 can be advantageously arranged at the imaginary central plane A.

The rotatable contact 4 comprises a conducting metal portion 41 that defines two end portions 42 adapted to make contact with the contact portions 52 of the fixed contact 5, depending on their position. The conducting metal portion 41 comprises advantageously two conducting laminae 41a, 41b. Such conducting laminae 41a, 41b can be joined by means of cold punching in two or more points, or by folding onto themselves two or more lateral wings of one of said laminae, or again they can be constituted by a single element that is folded onto itself. The conducting laminae 41a, 41b are interposed between a rotatable support 43, advantageously made of electrically insulating material, that is accommodated in the central seat 40, and a lid 44, also advantageously made of insulating material. The end portions 42 of the rotatable contact 4 protrude partially from the rotatable support 43 and from the lid 44 and are adapted to establish the electrical contact with the contact portions 52 of the fixed contact 5.

FIG. 6 illustrates the modular contact box 2 with the electrical contacts in the "off" configuration, in which the end portions 42 of the rotatable contact 4 are not in contact with the contact portions 52 of the fixed contact 5, thus preventing the flow of electric current between the two fixed contacts 5. FIG. 7 shows instead the modular contact box 2 with the electrical contacts in the "on" configuration, in which the end portions 42 of the rotatable contact 4 are in contact with the contact portions 52 of the fixed contact 5, allowing the flow of electric current between the two fixed contacts 5.

Figure 18:
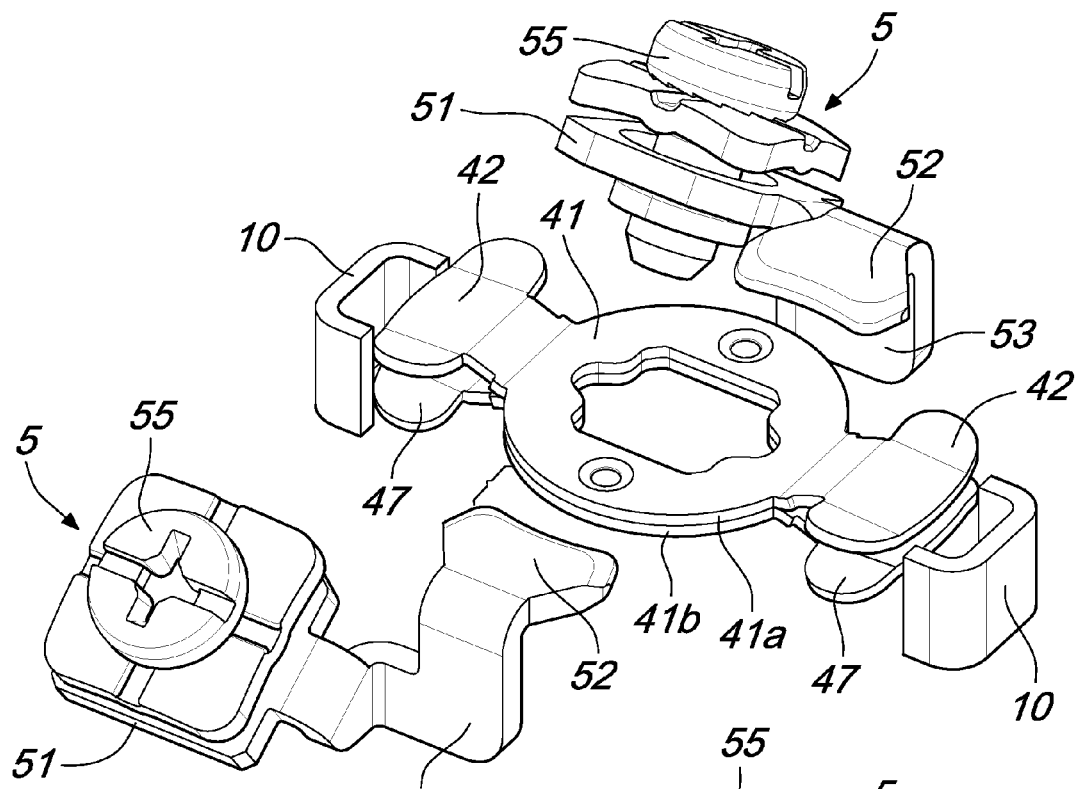
FIG. 18 is a perspective view of the electrical contact elements of the modular contact box of FIG. 6, shown with the electrical contacts in the "off" configuration.
Figure 19:
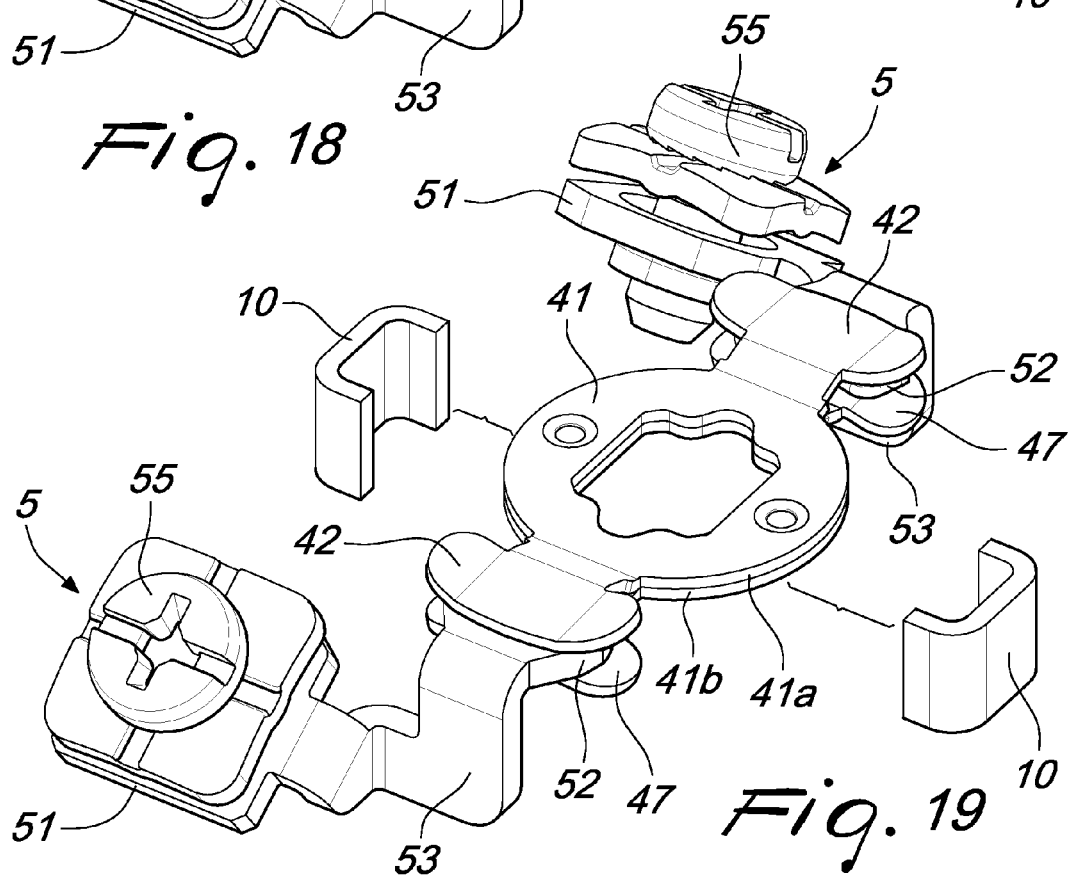
FIG. 19 is a perspective view of the electrical contact elements of the modular contact box of FIG. 6, illustrated with the electrical contacts in the "on" configuration.

As shown in particular in FIGS. 18 and 19, the conducting laminae 41a, 41b at the end portions 42 are divaricated so as to provide a slot 47 in which the contact portion 52 of the fixed contact 5 can slide, ensuring therefore electrical continuity between the rotatable contact 4 and the fixed contact 5.

Advantageously, the connection portion 53 is accommodated stably in an interlocking seat 33 formed in the box-like body 3. Moreover, the interlocking seat 33 can be filled advantageously with resin or silicone in order to increase the mechanical stability and the electrical insulation of the fixed contact 5.

Figure 10:
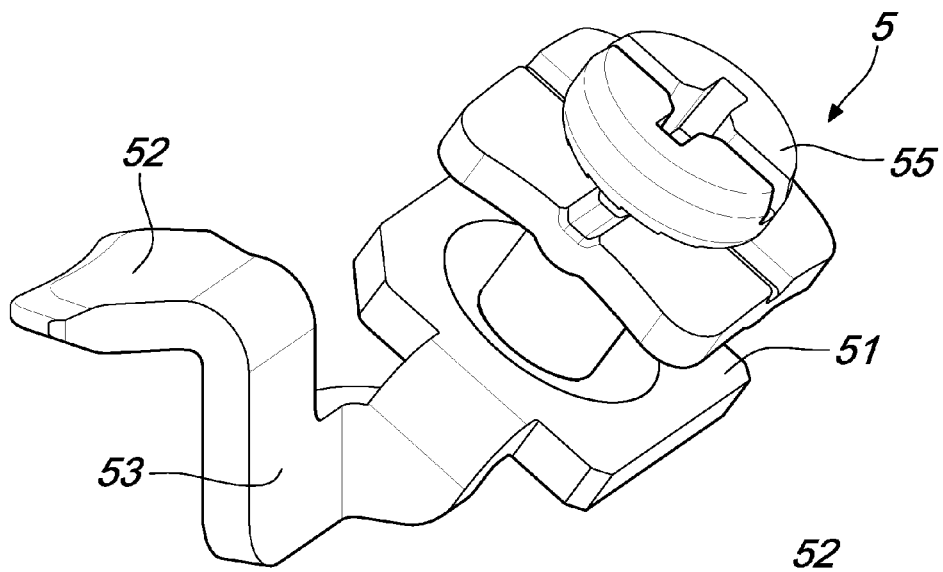
FIG. 10 is a perspective view of a fixed contact of a disconnector according to the disclosure.
Figure 11:
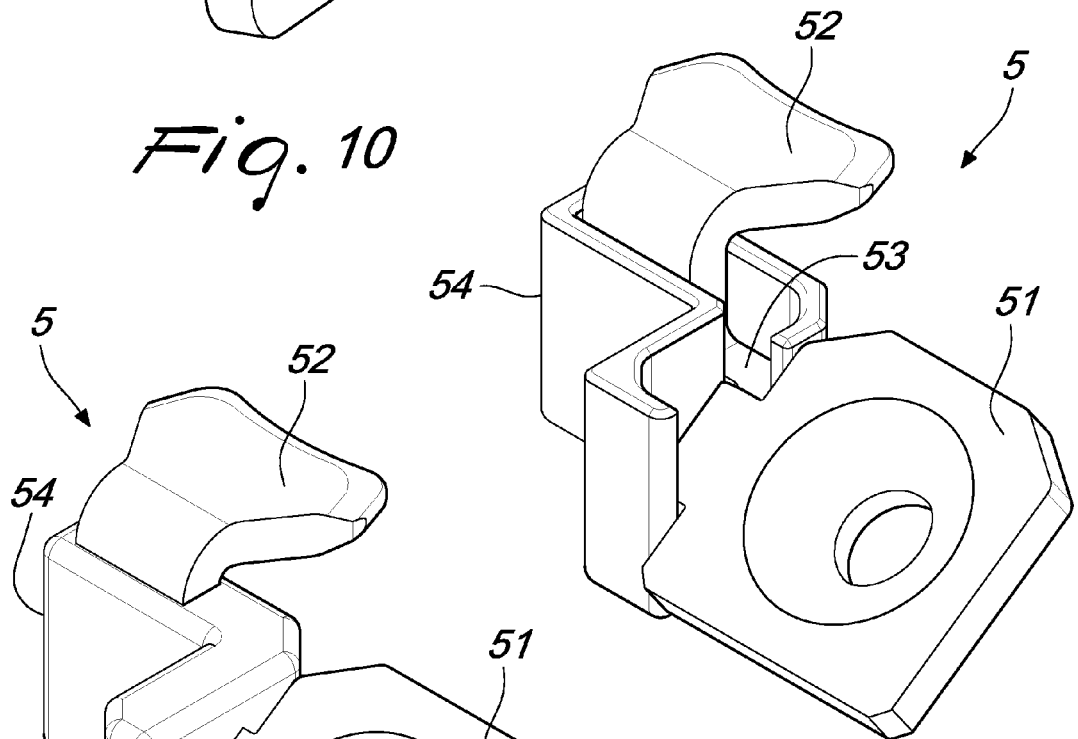
FIG. 11 is a perspective view of a first variation of the fixed contact of FIG. 10.
Figure 12:
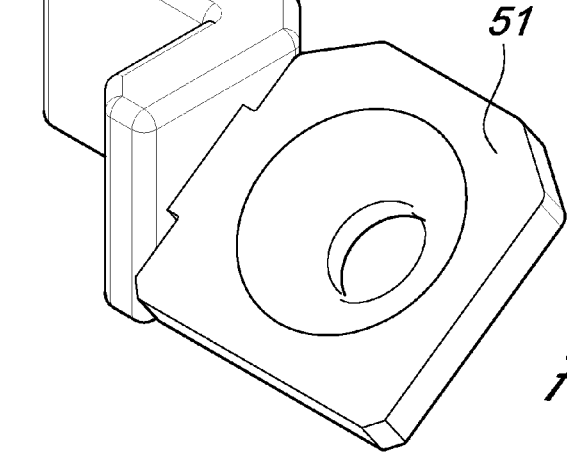
FIG. 12 is a perspective view of a second variation of the fixed contact of FIG. 10.

FIG. 10 shows the fixed contact 5. According to a first variation of the fixed contact 5, shown in FIG. 11, for each fixed contact 5 there is a containment element 54, made of insulating material, that surrounds at least partially the connection portion 53 of the fixed contact 5 and is accommodated stably, together with the connection portion 53, in the interlocking seat 33 formed in the box-like body 3. In this case also, it is possible to fill further the containment element 54 and/or the interlocking seat 33 with resin or silicone in order to stabilize mechanically and isolate electrically the fixed contact 5. According to a second variation, shown in FIG. 12, the containment element 54 is co-molded directly on the connection portion 53 of the fixed contact 5.

Advantageously, moreover, as shown particularly in FIGS. 6 to 8 and 13 to 17, the box-like body 3 comprises at least one reference pin 6 arranged proximate to a first side 31 of the box-like body 3 and a seat 7 for a reference pin 6 of a contiguous box-like body 3, arranged proximate to a second side 30 that is opposite said first side 31.

The reference pin 6 of each box-like body 3 engages the seat 7 of a contiguous box-like body 3, so that the two peripheral seats 50 of the box-like body 3 and the two peripheral seats 50 of the contiguous box-like body 3 are arranged proximate to two opposite sides 100, 101 of the disconnector 1.

Figure 14:
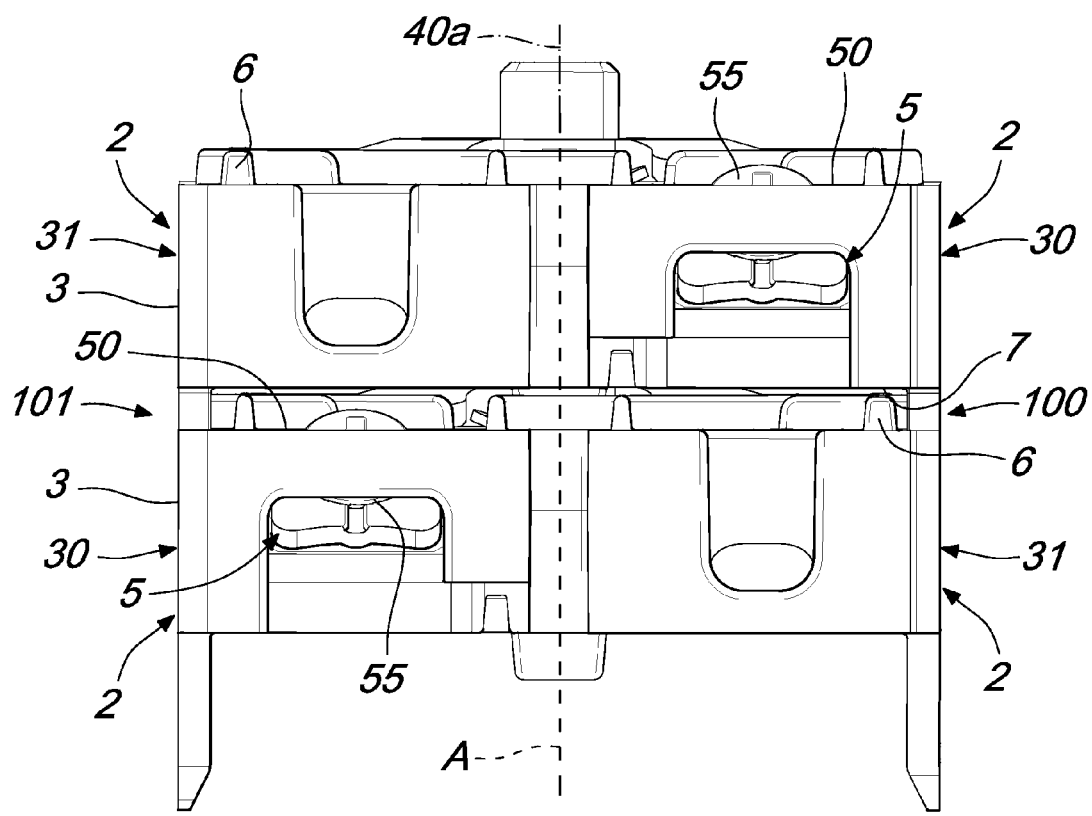
FIG. 14 is a side view of the coupling in correct position of two contiguous modular contact boxes.
Figure 15:
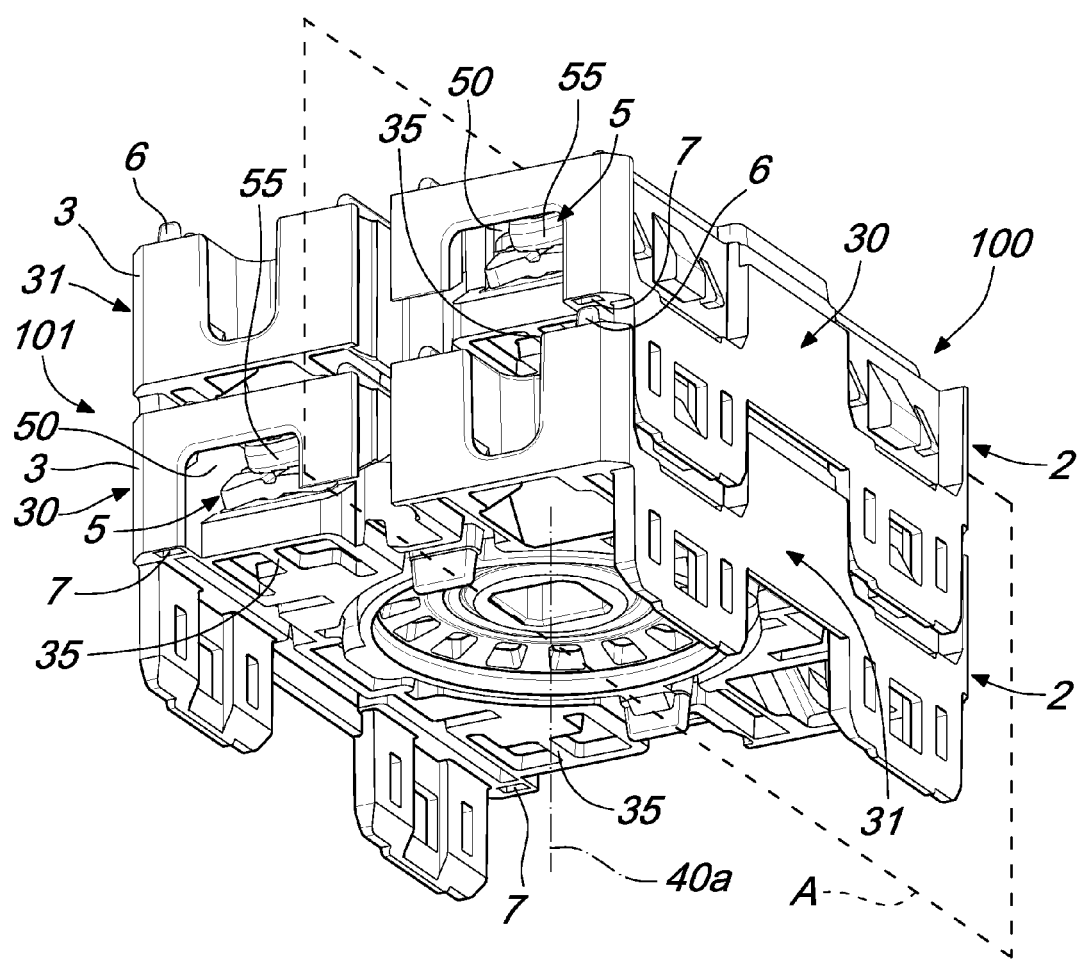
FIG. 15 is a perspective view of what is shown in FIG. 14.

FIGS. 14 and 15 show a correct coupling of a modular contact box 2 with the contiguous modular contact box 2, wherein the peripheral seats 50 that accommodate the fixed contacts 5 of the upper box-like body 3 are arranged proximate to the side 100 of the disconnector 1, while the peripheral seats 50 of the lower box-like body 3 are arranged proximate to the opposite side 101 of the disconnector 1.

Figure 16:
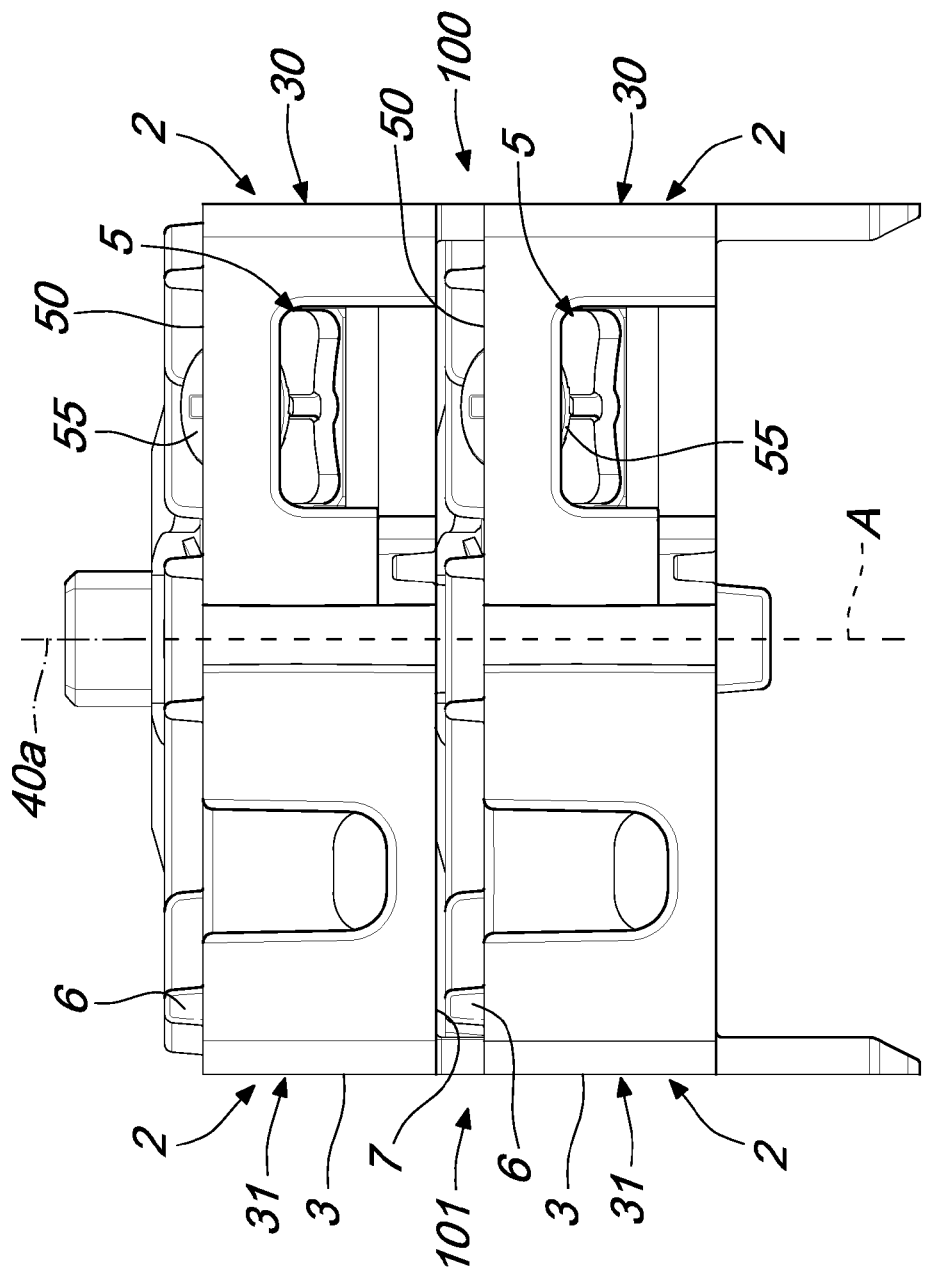
FIG. 16 is a side view of the coupling in the incorrect position of two contiguous modular contact boxes.
Figure 17:
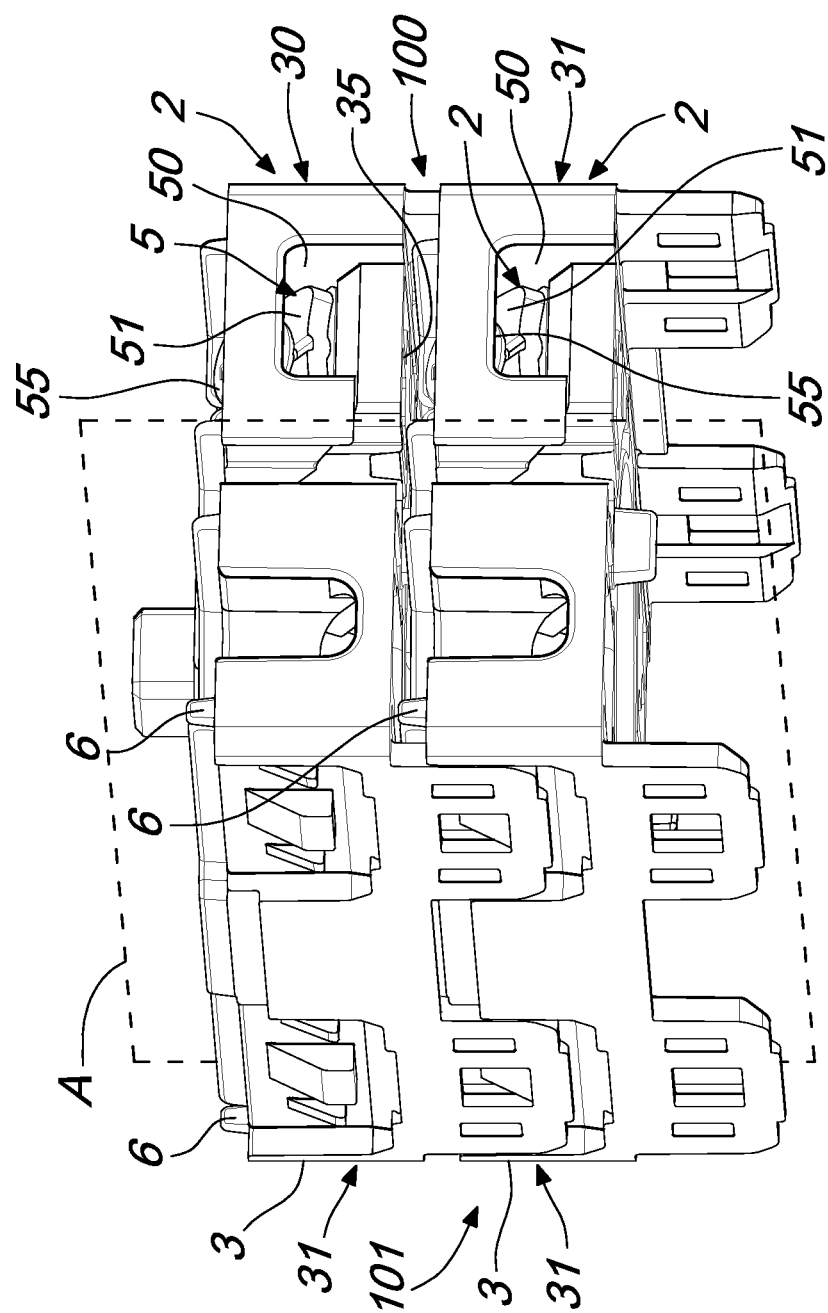
FIG. 17 is a perspective view of what is shown in FIG. 16.

FIGS. 16 and 17 illustrate, instead, an incorrect coupling of a contact box 2 with the contiguous contact box 2, wherein both the peripheral seats 50 of the upper box-like body 3 and those of the lower box-like body 3 are arranged proximate to the same side 100 of the disconnector 1. This coupling is prevented by the presence of the pin 6 of the lower box-like body 3, which does not match the corresponding seat 7 in the upper box-like body 3.

The coupling of the reference pin 6 and the corresponding seat 7 therefore prevents two or more contiguous box-like bodies 3 from allowing assembly so as to provide a disconnector 1 that has the fixed contacts 5 of a contact box 2 arranged proximate to the same side of the disconnector 1 with respect to the fixed contacts 5 of the contiguous contact box 2.

Figure 13:
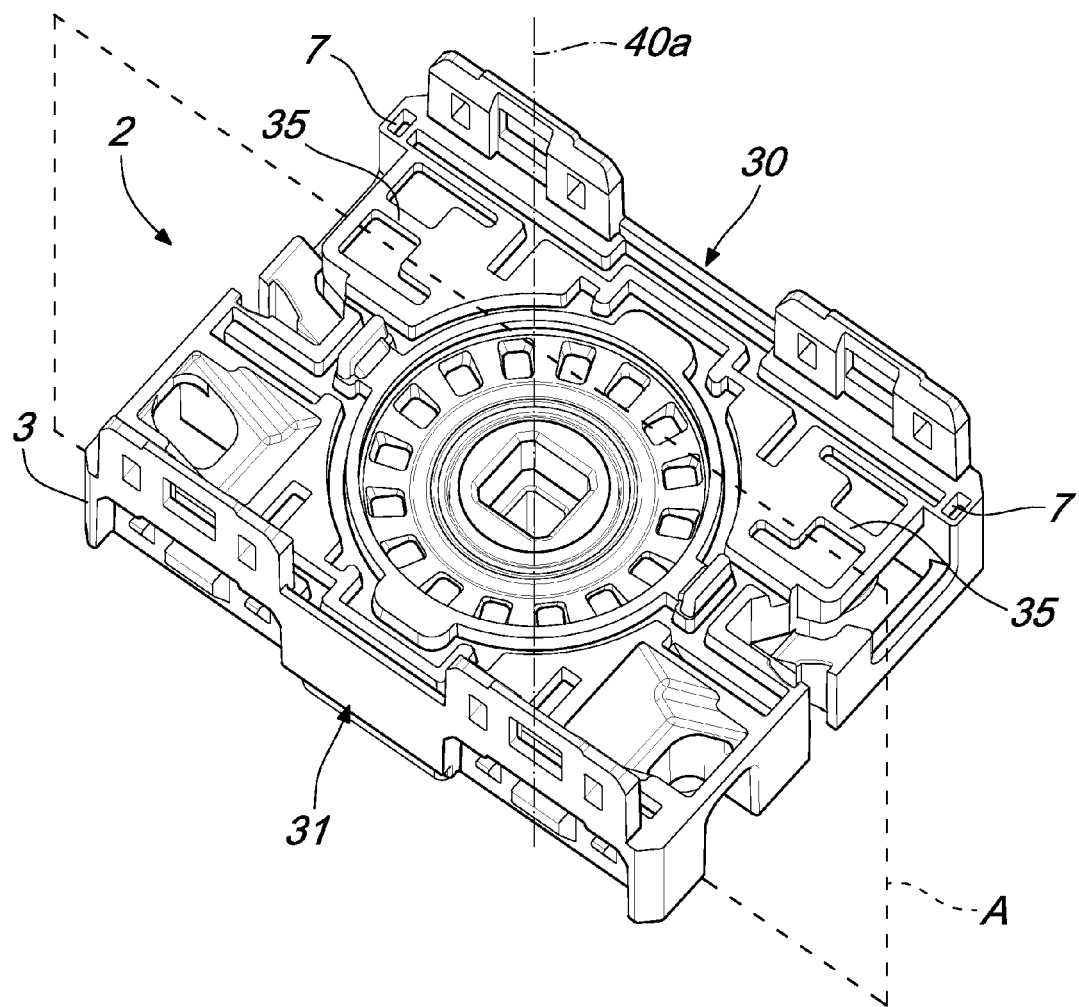
FIG. 13 is a perspective view of the modular contact box of FIG. 6, in the inverted position.

Moreover, each box-like body 3 can comprise a rib 35, shown in particular in FIG. 13, that is arranged on the lower surface of said box-like body 3 proximate to the same side 30 of the box-like body 3 in which the two peripheral seats 50 are arranged. Such rib 35 is adapted to interfere with the connection portion 51, in the specific case with the screw 55, of the fixed contact 5 of the contiguous box-like body 3. In this manner, as for the coupling of the reference pin 6 and the corresponding seat 7, the contiguous box-like body 3 is prevented from coupling with the box-like body 3, with the peripheral seats 50 of the two box-like bodies 3 arranged proximate to the same side of the disconnector 1.

Figure 5:
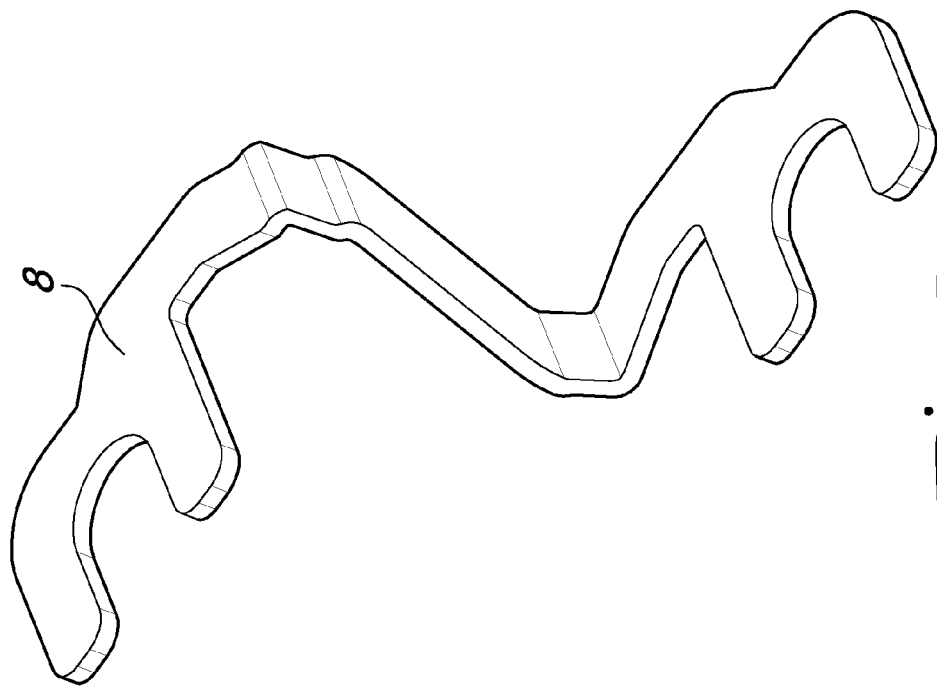
FIG. 5 is a perspective view of an external electrical connection bridge of the disconnector of FIG. 4.
Figure 3:
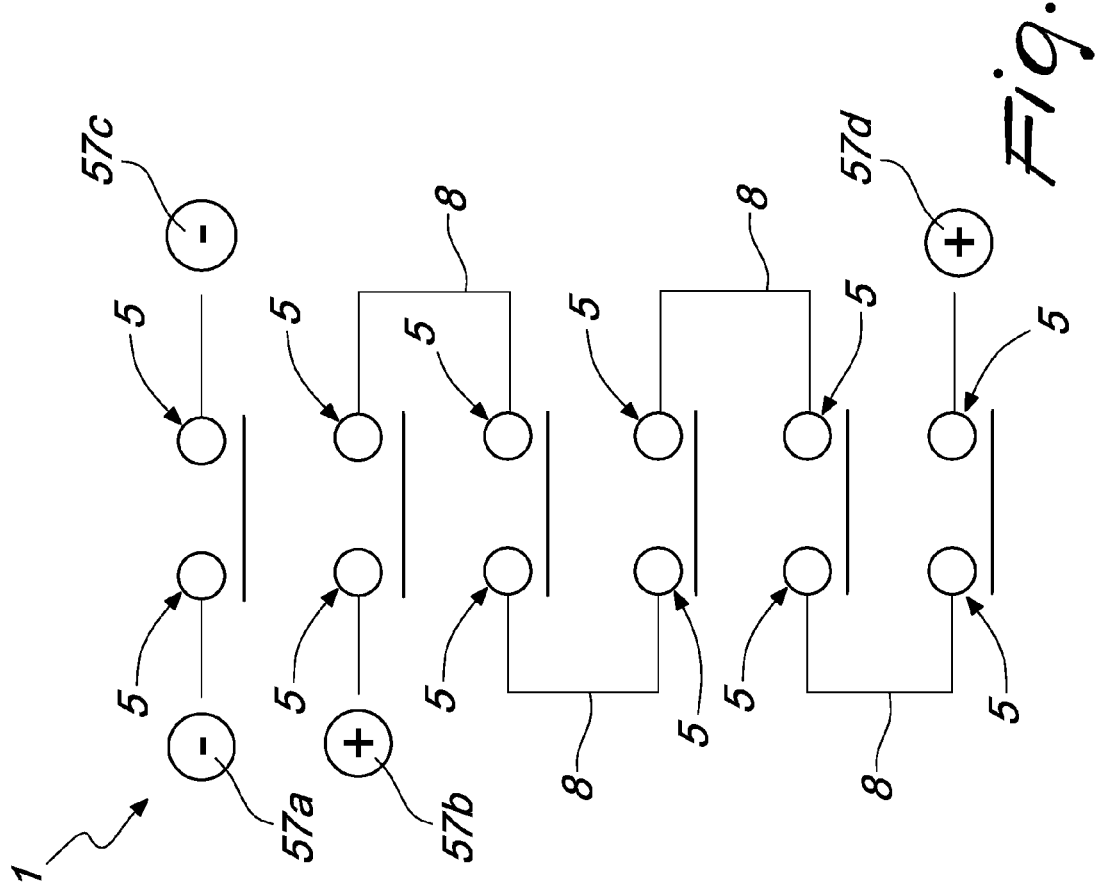
FIG. 3 is a view of an example of an electrical diagram related to the disconnector of FIG. 1.

FIG. 3 shows an example of an electrical diagram of the disconnector 1 shown in FIGS. 1, 2 and 3 and composed of 6 modular contact boxes 2. Some of the fixed contacts 5 are conveniently connected to the external electrical conductors with negative polarity 57a and 57c and with positive polarity 57b and 57d. The fixed contacts 5 not connected to the external electrical conductors 57a, 57b, 57c, 57d are conveniently connected to each other by a plurality of external electrical connection bridges 8. Each external electrical connection bridge 8 connects electrically the connection portions 51 of two fixed contacts 5 of two contiguous modular contact boxes 2. Advantageously, a single type of external electrical connection bridge 8, shown in FIG. 5, is adapted to connect equally a pair of fixed contacts 5 of two contiguous modular contact boxes 2.

Moreover, each modular contact box 2 can comprise at least one contact electrode 10 that is accommodated stably in interlocking seats formed in the box-like body 3, between two contact portions 52 of the fixed contacts 5 arranged in a same box-like body 3. The electrode 10, or pair of electrodes 10, interrupts the forming of an electric arc during the closure and opening of the electrical contacts, i.e., during the rotation of the rotatable contact 4.

FIGS. 6, 7, 8, 18 and 19 show the relative positions of the contact portions 52 of the fixed contacts 5 and of the electrodes 10 with respect to the positions that the end portions 42 of the rotatable contact can assume in the "on" and "off" configurations. The contact portions 52 are diametrically opposite with respect to the central seat 40; the electrodes 10 also are diametrically opposite with respect to the central seat 40, but along a direction that is substantially at right angles to the direction that joins the contact portions 52 of the fixed contacts 5.

The disconnector 1, moreover, can comprise means for locking the modular contact boxes 2. Such locking means, shown particularly in the exploded view of FIG. 4, each comprise a traction element 103, made of plastic or appropriately insulated metal, which passes, at least partially, through each modular contact box 2. The traction element 103 comprises, at a first end, two grip wings 105 that engage a seat 106 formed in the covering element 107 of the disconnector 1, and, at a second end, a threaded hole for the insertion of a closure screw 104 that passes through a base portion 108 of the disconnector. The base portion 108 can be integrated in an adapted box-like body 109 without electrical contacts, which is adapted to be fixed to the box-like body 3 of the outermost modular contact box 2, as shown with reference to the disconnector of FIGS. 1 and 2, or it can be constituted by the box-like body 3 itself of the outermost modular contact box 2, as shown in the disconnector variation of FIG. 4. The base element 108 of the variation of FIG. 4 comprises moreover advantageously a track 110 for the insertion of a fixing bar 111.

Operation of the disconnector is clear and evident from what has been described.

In practice it has been found that the disconnector, according to the present disclosure, achieves the intended aim and objects since it can be assembled easily and can have a limited bulk, extinguishing effectively the forming of electric arcs.

Another advantage of the disconnector, according to the disclosure, resides in the fact that it requires only one type of modular contact box. In fact, the suitable spacing between the fixed electrical contacts is achieved by superimposing one modular contact box on the contiguous one in a position rotated by 180°. This mutual positioning of the modular contact boxes allows an arrangement of the fixed contacts alternately on the two opposite sides of the disconnector and therefore conveniently spaced.

A further advantage of the disconnector, according to the disclosure, resides in the fact that it prevents the incorrect assembly of contiguous modular contact boxes, thanks to the presence of the coupling between the reference pin and the corresponding seat, and of the ribs for interfering with the locking screws of the fixed contacts.

Another advantage of the disconnector, according to the disclosure, resides in the fact that it has adapted interlocking seats both for the fixed contacts and for the electrodes, so as to improve the mechanical stability of these components in the box-like body and also its degree of electrical insulation. In particular, the fixed contacts and the electrodes are accommodated stably in the corresponding box-like body so that during the assembly steps, i.e., when the upper modular contact box has not been yet applied, the risk that they can move is minimal.

A further advantage of the disconnector, according to the disclosure, resides in the fact that it requires a single type of external electrical connection bridge adapted to connect any pair of fixed contacts of contiguous modular contact boxes.

Another advantage of the disconnector, according to the disclosure, resides in that the connection portions of the fixed contacts are distributed, in the disconnector, so that the different electric polarities can be distinguished easily, because they are arranged on the same side of the disconnector, and are not crossed.

Another advantage relates to the fact that the fixed contacts can be operated more easily by means, for example, of a screwdriver.

A further advantage of the disclosure resides in that it can be used also in various applications, both DC and AC.

The disconnector particularly for photovoltaic applications thus conceived is susceptible of numerous modifications and variations, all of which are within the scope of the inventive concept.

All the details may further be replaced with other technically equivalent elements.

In practice, the materials used, so long as they are compatible with the specific use, as well as the contingent shapes and dimensions, may be any according to the requirements.

The disclosures in Italian Patent Application No. MI2012A002175 from which this application claims priority are incorporated herein by reference.

The invention claimed is:

1. A disconnector for photovoltaic applications comprising at least two modular contact boxes, each of the modular contact boxes having a box-like body coupled to a contiguous box-like body of a contiguous modular contact box, each box-like body forming a central seat that accommodates a rotatable contact and two peripheral seats, each of which accommodates a connection portion of a corresponding fixed contact that can be accessed from the outside of each of the modular contact boxes, said rotatable contact being able to rotate about an axis of said central seat with respect to said box-like body in order to engage the fixed contacts arranged with their connection portion in said peripheral seats or to disengage from said fixed contacts, wherein said two peripheral seats of the same box-like body are arranged on the same side with respect to a central plane that passes through said axis of the central seat and wherein said two peripheral seats of a box-like body and the two peripheral seats of the contiguous box-like body are arranged on mutually opposite sides with respect to said central plane, wherein said box-like body comprises at least one reference pin, which is arranged proximate to a first side of said box-like body, and a seat for a reference pin of a contiguous box-like body, arranged proximate to a second side that is opposite said first side, said reference pin engaging the seat of said contiguous box-like body, said two peripheral seats of said box-like body and said two peripheral seats of said contiguous box-like body being arranged proximate to two opposite sides of the disconnector.

2. The disconnector according to claim 1, wherein said box-like body has a substantially rectangular plan shape, said central seat passing through the two opposite end faces of said box-like body and said central plane being parallel to two opposite sides of said box-like body.

3. A disconnector for photovoltaic applications comprising at least two modular contact boxes, each of the modular contact boxes having a box-like body coupled to a contiguous box-like body of a contiguous modular contact box, each box-like body forming a central seat that accommodates a rotatable contact and two peripheral seats, each of which accommodates a connection portion of a corresponding fixed contact that can be accessed from the outside of each of the modular contact boxes, said rotatable contact being able to rotate about an axis of said central seat with respect to said box-like body in order to engage the fixed contacts arranged with their connection portion in said peripheral seats or to disengage from said fixed contacts, wherein said two peripheral seats of the same box-like body are arranged on the same side with respect to a central plane that passes through said axis of the central seat and wherein said two peripheral seats of a box-like body and the two peripheral seats of the contiguous box-like body are arranged on mutually opposite sides with respect to said central plane, wherein each modular contact box comprises two fixed contacts, each of said fixed contacts includes: a corresponding first connection portion configured to be accessed from the outside of said modular contact box, a contact portion adapted to establish an electrical contact with said rotatable contact, and a second connection portion that extends between said first connection portion and said contact portion, said second connection portion being accommodated stably in an interlocking seat that is formed in said box-like body.

4. The disconnector according to claim 3, wherein the contact portions of the fixed contacts arranged in the same box-like body are arranged at said central plane.

5. The disconnector according to claim 3, comprising a containment element, made of insulating material, which surrounds at least partially said second connection portion of said fixed contact and is accommodated stably, together with said second connection portion, in said interlocking seat formed in said box-like body.

6. The disconnector according to claim 5, wherein said containment element is co-molded on said second connection portion.

7. The disconnector according to claim 3, comprising at least one external electrical connection bridge, the first connection portions of the fixed contacts of contiguous modular contact boxes being connectable electrically by a single type of said external electrical connection bridge.

8. A disconnector for photovoltaic applications comprising at least two modular contact boxes, each of the modular contact boxes having a box-like body coupled to a contiguous box-like body of a contiguous modular contact box, each box-like body forming a central seat that accommodates a rotatable contact and two peripheral seats, each of which accommodates a connection portion of a corresponding fixed contact that can be accessed from the outside of each of the modular contact boxes, said rotatable contact being able to rotate about an axis of said central seat with respect to said box-like body in order to engage the fixed contacts arranged with their connection portion in said peripheral seats or to disengage from said fixed contacts, wherein said two peripheral seats of the same box-like body are arranged on the same side with respect to a central plane that passes through said axis of the central seat and wherein said two peripheral seats of a box-like body and the two peripheral seats of the contiguous box-like body are arranged on mutually opposite sides with respect to said central plane, wherein said box-like body comprises a rib that is arranged on a lower surface of said box-like body proximate to the same side of said box-like body where said two peripheral seats are arranged, said rib of said box-like body being adapted to interfere with a first connection portion of the fixed contact of the contiguous box-like body to prevent the coupling of said box-like body that is contiguous to said box-like body with the peripheral seats of said two box-like bodies that are arranged on the same side of said central plane.

9. A disconnector for photovoltaic applications comprising at least two modular contact boxes, each of the modular contact boxes having a box-like body coupled to a contiguous box-like body of a contiguous modular contact box, each box-like body forming a central seat that accommodates a rotatable contact and two peripheral seats, each of which accommodates a connection portion of a corresponding fixed contact that can be accessed from the outside of each of the modular contact boxes, said rotatable contact being able to rotate about an axis of said central seat with respect to said box-like body in order to engage the fixed contacts arranged with their connection portion in said peripheral seats or to disengage from said fixed contacts, wherein said two peripheral seats of the same box-like body are arranged on the same side with respect to a central plane that passes through said axis of the central seat and wherein said two peripheral seats of a box-like body and the two peripheral seats of the contiguous box-like body are arranged on mutually opposite sides with respect to said central plane, wherein each modular contact box comprises at least one contact electrode that is accommodated stably in interlocking seats formed in said box-like body, between two contact portions of the fixed contacts arranged in the same box-like body.

\* \* \* \* \*